United States Patent [19]

Glunk

[11] Patent Number: 4,691,504

[45] Date of Patent: Sep. 8, 1987

[54] ROTARY MOWER FOR A TRACTOR

[75] Inventor: Josef Glunk, Gottmadingen, Fed. Rep. of Germany

[73] Assignee: Klockner-Humboldt-Deutz AG Zweigniederlassung Fahr, Gottmadingen, Fed. Rep. of Germany

[21] Appl. No.: 819,157

[22] Filed: Jan. 14, 1986

[30] Foreign Application Priority Data

Jan. 15, 1985 [DE] Fed. Rep. of Germany ....... 3501123

[51] Int. Cl.$^4$ ............................................. A01D 55/18
[52] U.S. Cl. .......................................... 56/192; 56/6; 56/13.6
[58] Field of Search .................... 56/6, 13.6, 192, 295, 56/17.5, 16.4, DIG. 1

[56] References Cited

U.S. PATENT DOCUMENTS 3,716,973 2/1973 Kidd ........................................ 56/6

FOREIGN PATENT DOCUMENTS 1507272 4/1970 Fed. Rep. of Germany ............ 56/6
1582353 8/1970 Fed. Rep. of Germany ............ 56/6
2703043 7/1978 Fed. Rep. of Germany ........ 56/192
1488684 7/1967 France ................................... 56/192

Primary Examiner—Robert P. Swiatek
Assistant Examiner—John G. Weiss
Attorney, Agent, or Firm—Karl F. Ross; Herbert Dubno

[57] ABSTRACT

The rotary mowing attachment for a tractor or the like comprises a mowing drum mounting member, preferably a mounting bar, laterally mountable on a tractor or the like, four mowing drums attached to the underside of the mowing drum mounting member, and at least one cutting tool attached to each mowing drum, wherein the cutting diameters of the cutting tools on at least two mowing drums are different, the cutting diameters of all adjacent mowing drums overlap, and at least one of the mowing drums rotates in a direction of rotation opposite to that of the remaining mowing drums.

5 Claims, 3 Drawing Figures

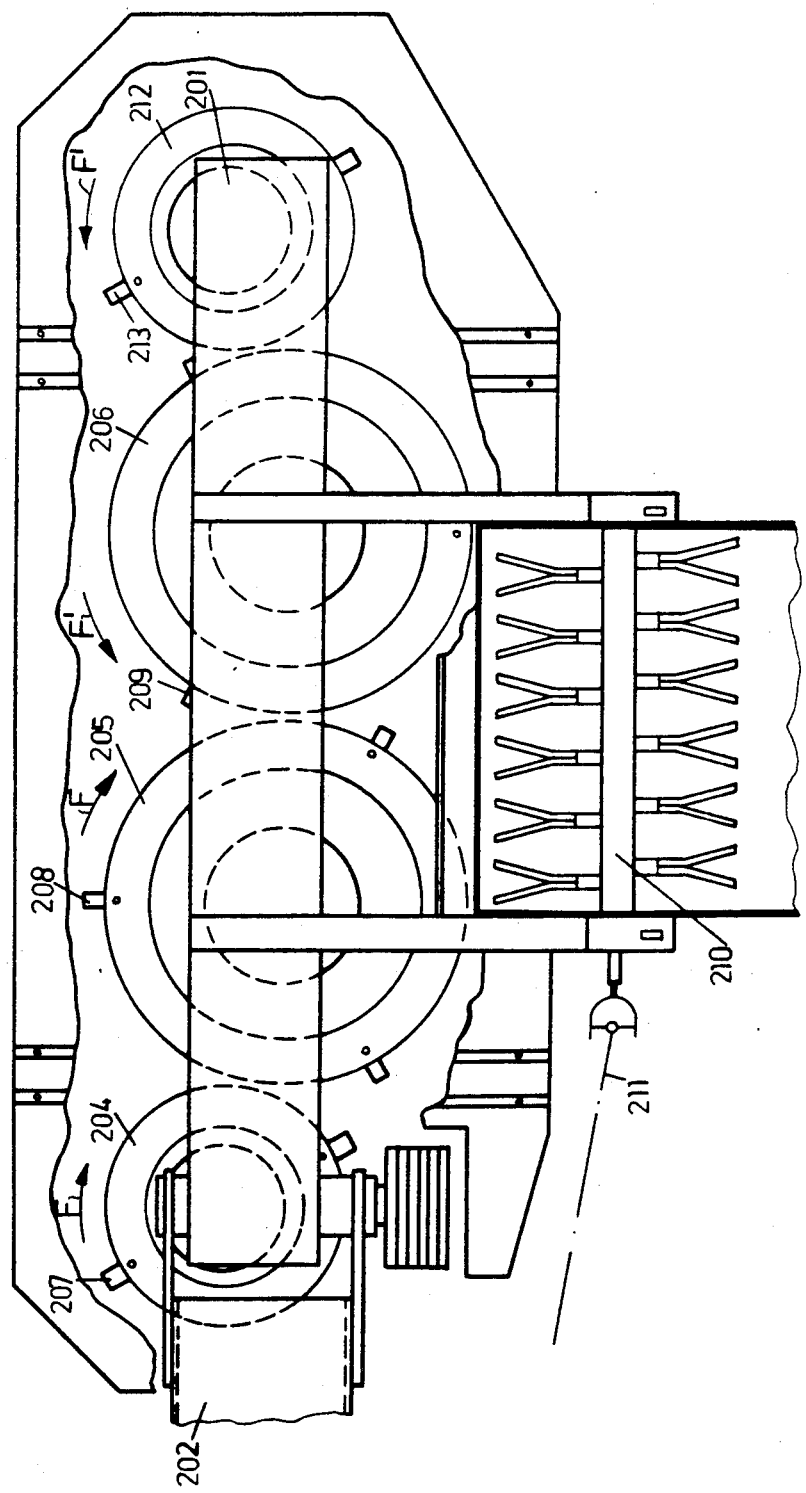

ROTARY MOWER FOR A TRACTOR

SPECIFICATION

1. Field of the Invention

My present invention relates to a rotary mower adapted to be mounted as an outrigger attachment upon a tractor.

BACKGROUND OF THE INVENTION

A rotary mower can comprise a mounting bar laterally mountable on a tractor, one or more pairs of counter-rotating mowing drums rotatably mounted on the underside of the bar with their axes of rotation substantially upright, and at least one cutting blade mounted on the bottom of each of the mowing drums, the cutting diameters for cutting tools mounted on adjacent mowing drums overlapping each other to provide complete cutting over their entire cutting width; the mowing drums are rotatably driven by a power take-off from the tractor.

In U.S. Pat. No. 4,269,019 issued Mar. 29, 1981 to Gerhard Strobel and U.S. Pat. No. 4,030,275 issued June 21, 1977 to Hermann Ruprecht the structure of the mowing drums and their cutting tools is described in detail. These mowing drums generally comprise a cylindrical portion attached to a lower outwardly flared skirt having usually a plurality of cutting blades, and a central shaft mounted on the support. U.S. Pat. No. 4,030,275 describes a flap or deflection plate attached adjacent the mowing drum to help form a proper swath, and an improved flared skirt, which helps prevent clogging, while the swath is being formed. U.S. Pat. No. 3,965,658 describes mowing drums having an upper conical surface having air holes and lower openings through which air can pass during rotation, so that air is properly directed during cutting and does not interfere with swath formation.

Mowers can have two adjacent mowing drums rotating in opposite directions, as taught in U.S. Pat. Nos. 3,965,658, 4,192,123, and German Patent Document open application No. DE-OS 27 03 043.

The harvested cuttings are deposited between the adjacent counter-rotating mowing drums, in a windrow behind the mowing attachment and usually in the center of the cutting swath.

A disadvantage of a rotary mower with a pair or pairs of counter-rotating mowing drums is that with the standard tractor the track widths of the tractor are such that during cutting a previously formed swath deposited by the rotary mowing attachment can be run over by the wheels of the tractor during the cutting of the next swath.

In order to eliminate this disadvantage, it is known, as taught in German Patent Document No. DE-OS 27 03 043, to make the cutting diameter for the cutting tool on the mowing drum positioned furthest from the tractor larger than the cutting diameter for the cutting tool on the mowing drum positioned closest to the tractor in a rotary mowing attachment with two rotating mowing drums, so that the mowing width is increased to such an extent that the conventional tractor with commonly employed track spacing will no longer run over its previously deposited swath. In this known rotary attachment a widening of the crop windrow also occurs, that is there is an increase in the windrow width which corresponds to half the difference between the diameters of the mowing drums, and is small by comparison to the total cutting width or swath width of the rotary mowing attachment.

There is a limit to the size to which two rotors or mowing drums can be increased to increase the cutting swath width of the rotary mowing attachment. When the mowing drums are too large the single windrow formed may be too large and may clog the cutter and prevent conditioning in a convenient manner. Mowing drums which are too large may be inconvenient to mount in the cutter or may be difficult to properly design. Naturally, it is therefore desirable to provide a rotary mowing attachment, having an increased mowing width or cutting swath, but with a minimum windrow or deposited-material width.

OBJECTS OF THE INVENTION

It is an object of my invention to provide an improved rotary mower for a tractor whereby drawbacks of earlier mowers can be obviated.

It is also an object of my invention to provide an improved rotary mower for a tractor, with a comparatively large cutting or swath width, but with only a single windrow of small width while simultaneously having a comparatively simple, low maintenance structure, which is not cumbersome or difficult to operate.

It is yet another object of my invention to provide an improved rotary mower for a tractor of a comparatively simple structure, which has greater cutting swath width than those of the prior art while maintaining deposited windrow width, but so constructed that the wheels of the tractor pulling it can not crush the windrow.

SUMMARY OF THE INVENTION

These objects and others which will become more apparent hereinafter are attained in accordance with my invention in a rotary mower laterally mountable on a tractor comprising a mowing drum mounting member, preferably formed as a mounting bar or beam, a plurality of mowing drums rotatably mounted on the underside of the mowing drum mounting member with the axes of rotation of the mowing drums substantially upright, at least one cutting tool mounted on the underside of each of the mowing drums, wherein the cutting diameters or orbits for each pair of cutting tools mounted on adjacent ones of the mowing drums overlap each other, and the mowing drums are driven rotatably by the power take-off shaft of the tractor.

According to my invention, at least three mowing drums are mounted on the mowing drum mounting member, the cutting orbits of the cutting tools on at least two of the mowing drums are different from each other, and at least one of the mowing drums rotates in a direction opposite to the direction of rotation of the other two mowing drums.

In one embodiment of my invention three mowing drums are mounted on the mowing drum mounting members, the cutting tools mounted on different ones of the mowing drums have different diameters of the cutting orbits, and the two of the three mowing drums closest to the tractor rotate in the same direction of rotation, while the remaining or third one of the three mowing drums rotates in a direction opposite to the two mowing drums closest to the tractor.

According to a second embodiment of my invention three mowing drums are mounted on the mowing drum mounting member, the mowing drum closest to the tractor has cutting tools mounted thereon having smaller cutting diameters than those on the remaining mowing drums, and the two of the mowing drums closest to the tractor rotate in the same direction of rotation, while the one of the mowing drums furthest from the tractor rotates in a direction of rotation opposite to that of the two of the three mowing drums closest to the tractor.

According to a third embodiment of my invention four mowing drums are mounted on the mowing drum mounting member, the cutting diameters of the cutting tools mounted on the two of the four mowing drums mounted on opposite ends of the mowing drum mounting member are smaller than the cutting diameters of the remaining mowing drums, and the two of the four mowing drums closest to the tractor rotate in the same direction of rotation, while the other two mowing drums furthest from the tractor rotate in an opposite direction of rotation.

One advantageous feature of the third embodiment of my invention comprises mounting the two mowing drums on opposite ends of the mowing drum mounting member, their axes of rotation are positioned in the operating or travel direction in front of a plane containing the axes of rotation of the remaining mowing drums.

In another advantageous feature of my invention a conditioning device for working up the cuttings, swath, and the like is provided behind the adjacent pair of mowing drums rotating in opposite directions.

In the mower of the invention, as in the conventional rotary mowing attachment, the swath is deposited between two mowing drums rotating in opposite directions of rotation. According to our invention, however, one or two additional mowing drums having different cutting diameters provide a mowing or swath width, that is, a cutting width, which is considerably larger than that formed by the prior art rotary mowing attachment.

This improved cutting ability also partially results from the fact that the smaller mowing drums with the smaller cutting diameters rotating in the same direction of rotation as the adjacent larger mowing drums provide a facile complete transfer of their cuttings to the codirectional rotating drum, while both the transport path and the amount of cuttings transferred are smaller than if two equal sized mowing drums were employed. Thus the transfer of the cuttings or the like is both easier and more reliable.

The additional smaller mowing drums may be positioned somewhat to the front of the larger mowing drums, to provide a better transfer to the larger mowing drums.

A small conditioning device is positioned behind the two larger mowing drums which have opposite directions of rotation, in order to treat the crop material of the windrow, e.g., by crushing, cutting or treating.

When the mowing drums have approximately the same peripheral speeds and consequently different angular velocities, a different number of cutting tools is provided for each of the adjacent mowing drums. Furthermore, it is also possible to change the angular velocities of the adjacent drums if they are to have the same number of cutting tools.

BRIEF DESCRIPTION OF THE DRAWING

The above and other objects, features, and advantages of my invention will become more readily apparent from the following description, reference being made to the accompanying highly diagrammatic drawing in which:

FIG. 3 is a cutaway top view of a third preferred embodiment of the rotary mowing attachment for a tractor according to my invention, which has four mowing drums.

SPECIFIC DESCRIPTION

Figure 1:
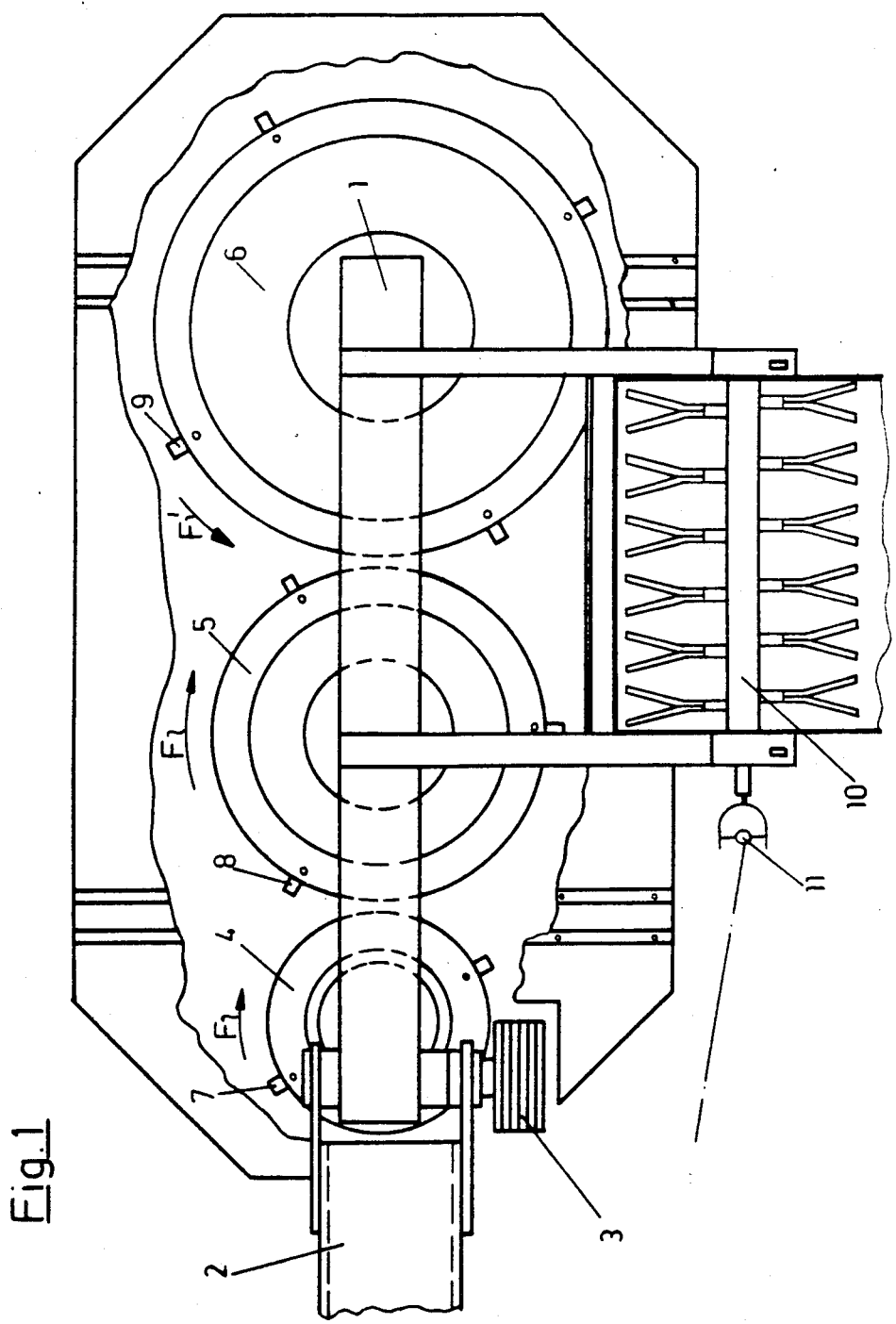
FIG. 1 is a partially cutaway top schematic top view of a first preferred embodiment of the rotary mowing attachment for the tractor according to my invention, showing three drums with different cutting diameters.

In the first embodiment shown in FIG. 1 the rotary mowing attachment has a mounting bar or beam 1 extending transverse to the operating direction of the apparatus, which can be laterally attached to a tractor by a mounting device 2. Under the mounting bar 1 three mowing drums (in this case mowing drums 4, 5, and 6) are mounted with substantially upright rotation axes, so that these mowing drums 4, 5, and 6 can be set in rotation by a suitable drive 3. On the underside of each of the mowing drums 4, 5, or 6 cutting tools or rotary cutting blades 7, 8, or 9 respectively are provided, in such a way that the cutting diameters of two adjacent mowing drums 4 and 5 or 5 and 6 described by these cutting tools 7, 8, and 9 overlap.

The cutting tools 7, 8, and 9 are, for example, cutting blades which are mounted on the outer edge of a projecting circular shoulder or apron of the mowing drums 4, 5, and 6 which can be of the construction described in the aforementioned patents.

As is apparent from FIG. 1, the sizes of the different cutting diameters described by the orbitting cutting tools 7, 8, or 9 are such that the mowing drum 4 closest to the tractor has the smallest cutting diameter, the middle mowing drum 5 has a cutting diameter which is larger than the cutting diameter of the innermost mowing drum 4, and the outermost mowing drum 6 has the largest cutting diameter.

The mowing drum 4 closest to the tractor and the middle mowing drum 5 have the same direction of rotation as is indicated by the arrows F beside each of the mowing drums 4 and 5. The outermost mowing drum 6 has a direction of rotation opposite to the direction of rotation of the mowing drums 4 and 5, as is indicated by the arrow F'. Because of that the windrow is deposited between both mowing drums 5 and 6, while the material mowed by the mowing drum 4 closest to the tractor is fed to the mowing drum 5 next to it.

At the position where the windrow builds up between the mowing drums 5 and 6 a comparatively small conditioning apparatus 10 is positioned behind the mowing drums 5 and 6, which are rotatably driven by a suitable drive 11.

Since the first mowing drum 4 has a smaller diameter than the mowing drum 5 adjacent to it, both the transport path and the transported quantity of cuttings are smaller than they would be with two equal sized mowing drums. Thus the transfer from the mowing drum 4 to the mowing drum 5 is easier and more reliable. The mowing drum 4 closest the tractor shows a smaller diameter toward the front in the direction of operation, so that one gets a still better transfer to the larger mowing drum 5 lying next to it.

The mowing drums 4, 5, and 6 have approximately equal circumferential speeds and consequently different rotational speeds or angular velocities, so that the number of cutting tools per mowing drum is adapted to these rotational speeds, or similarly the rotational speed and the diameter of the mowing drums are adapted to the number of cutting tools.

In the case of the embodiment shown in FIG. 1, for example, the mowing drum 4 having the smallest diameter can have only two cutting tools 7, while the next largest mowing drum 5 can have three cutting tools 8, and the mowing drum 6 with the largest diameter can have four cutting tools 9.

Figure 2:
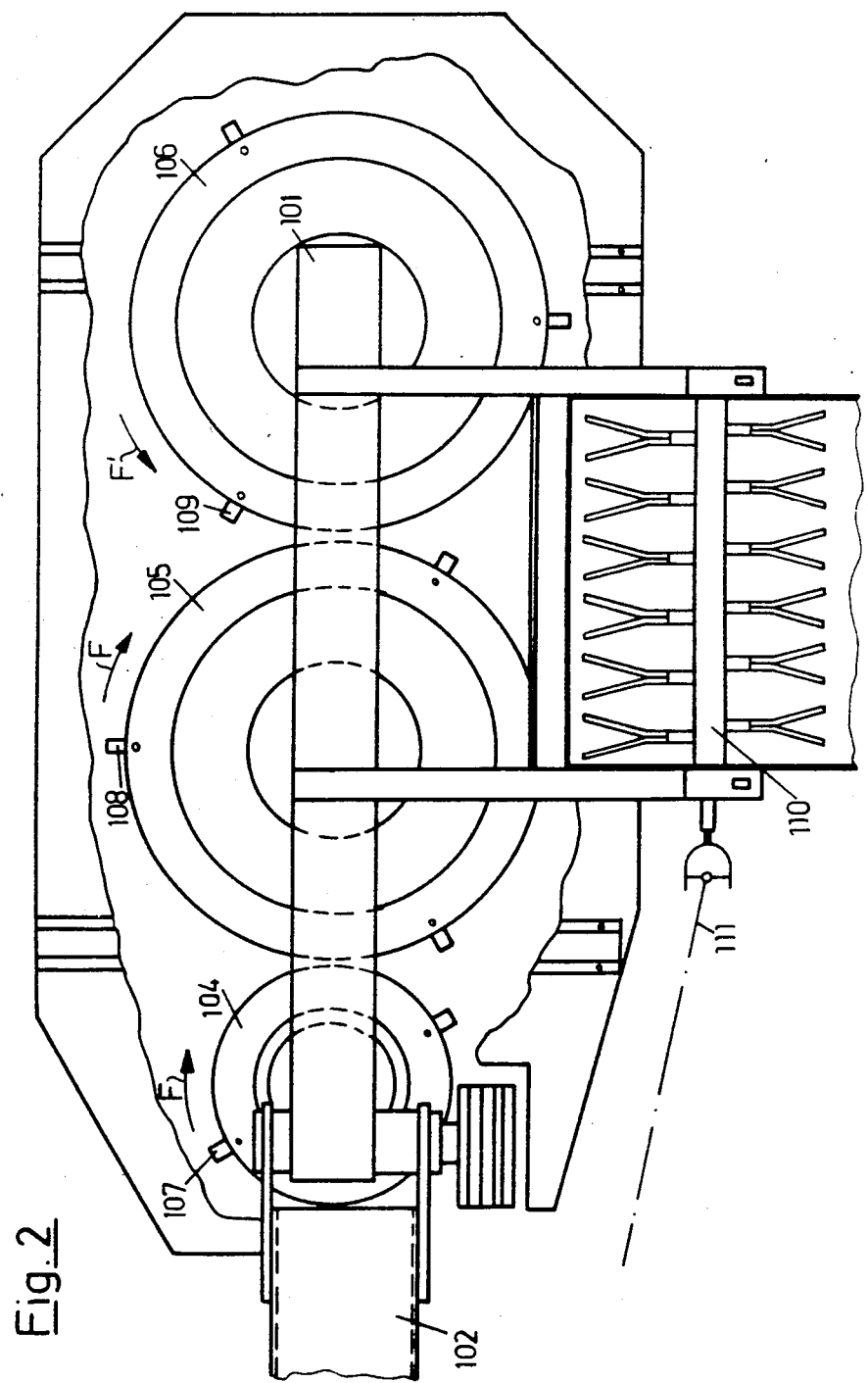
FIG. 2 is also a partially cutaway top view, but of a second preferred embodiment of the rotary mowing attachment for a tractor according to my invention.

In the second preferred embodiment shown in FIG. 2, in which similar or identical parts are indicated with corresponding numbers in the 100's (i.e., the part labelled 4 in FIG. 1 corresponds to 104 in FIG. 2), three mowing drums 104, 105, and 106 are likewise mounted on the underside of the mounting bar 101, however middle mowing drum 105 and outer mowing drum 106 have the same cutting diameter, while the mowing drum 104 closest to the tractor has the smallest cutting diameter of all the mowing drums 104, 105, and 106. This means also that the cutting diameters of the cutting tools 107 of the mowing drum 104 are smaller than those of the other remaining mowing drums 105 and 106.

Also here the rotational direction of the mowing drum 104 is in the same direction as that of mowing drum 105, however the rotation direction of the mowing drum 106 is opposite to that of mowing drum 105, so that also here the windrow deposition occurs between both mowing drums 105 and 106, which are equal in size and the cuttings are worked up in that location by a conditioning mechanism 110.

In the third preferred embodiment shown in FIG. 3 four mowing drums are positioned on a mounting bar 201, wherein both middle mowing drums 205 and 206 have an equal diameter and also have equal cutting diameters for their cutting tools 208 and 209, while two additional smaller mowing drums 204 and 212 are provided with cutting tools 207 and 213 having smaller cutting diameters. The mowing drum 204 closest to the tractor has the same rotational direction as the larger adjacent mowing drum 205, as indicated by the arrows F, while both the other mowing drums 206 and 212 rotate in the opposite direction as indicated by the arrows F'. Additionally in this embodiment both mowing drums 204 and 212 are set forward in the operating direction of the apparatus, so that their axes of rotation lie in front of the plane, in which the rotation axes of the middle mowing drums 205 and 206 lie. This ensures a problem-free and easy transfer of the cuttings or transfer from the additional or auxiliary mowing drums 204 and 212 to the adjacent larger mowing drums 205 and 206 between which the windrow is deposited occurs. Similarly in this embodiment the same or similar parts as those of the embodiment of FIG. 1 are labelled with reference characters in a 200 series.

With the cutting drums according to my invention one attains a single windrow with simultaneously increased swath width, without corresponding stoppages due to clogging and the like.

I claim:

1. In a rotary mower laterally mountable on a tractor comprising a mowing drum mounting member connected to said tractor, a plurality of said mowing drums rotatably mounted on the underside of said mowing drum mounting member with the axes of rotation of said mowing drums substantially upright, at least one cutting tool mounted on a bottom of each of said mowing drums, wherein the cutting diameters for orbits of said cutting tools mounted on adjacent mowing drums overlap each other and said mowing drums are driven rotatably by said tractor, the improvement wherein at least three of said mowing drums are mounted on said mowing drum mounting member, said cutting diameters for said cutting tools mounted on at least two different ones of said mowing drums are different, and at least one of said mowing drums is rotated in a direction of rotation opposite to that of another two of said mowing drums, four of said mowing drums being munted on said mowing drum mounting member, two of said mowing drums being mounted on opposite ends of said mowing drum mounting member and having said cutting tools mounted thereon whose cutting diameters are smaller than said cutting diameters of the remaining mowing drums, the two mowing drums closest to said tractor rotating in the same direction of rotation, the other two of said mowing drum furthest from said tractor rotating in an opposite direction of rotation.

2. The improvement according to claim 1 wherein axes of rotation of at least one of said two of said mowing drums mounted on said opposite ends of said mowing drum mounting member is positioned in a travel direction ahead of a plane containing axes of rotation of others of said mowing drums.

3. The improvement according to claim 1 wherein a conditioning device for working up the cuttings is provided behind the two mowing drums which have opposite directions or rotation but are adjacent.

4. A rotary mower laterally mountable on a tractor comprises:
   a mounting bar attachable laterally to said tractor;
   four mowing drums rotatably mounted on the underside of said mounting bar in succession with axes of rotation of said mowing drums substantially upright;
   at least one cutting tool mounted on an underside of each of said mowing drums, wherein cutting diameters for each pair of said cutting tools mounted on adjacent ones of said mowing drums overlap each other; and
   means for driving said drums so that a pair of said mowing drums closest to said tracctor rotate in the same direction of rotation, a pair of said mowing drums furthest from said tractor rotate in an opposite direction of rotation said cutting diameters of said cutting tools on the mowing drum cloest to aid tractor and on the mowing drum furthest from the tractor being smaller than said cutting diameters of said cutting tools on the other mowing drums.

5. A rotary mower according to claim 4 wherein said mowing drums closest to said tractor and said mowing drums furthest from said tractor are positioned slightly forward of the remaining ones of said mowing drums in a direction of travel of the rotary mower.

* * * * *